Aug. 2, 1966  K. W. CLARK ETAL  3,264,482
GAS TURBINE ENGINES
Filed Aug. 22, 1963  4 Sheets-Sheet 2
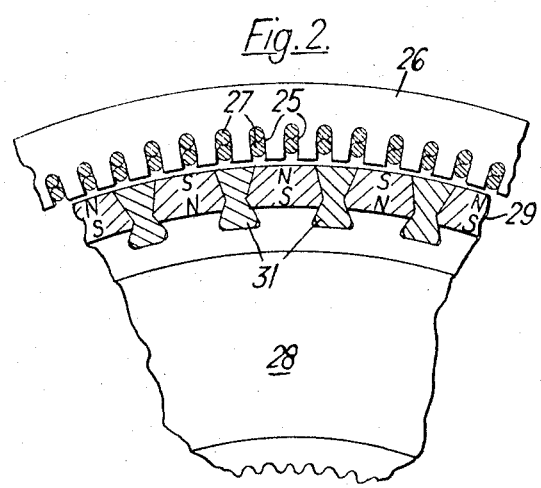
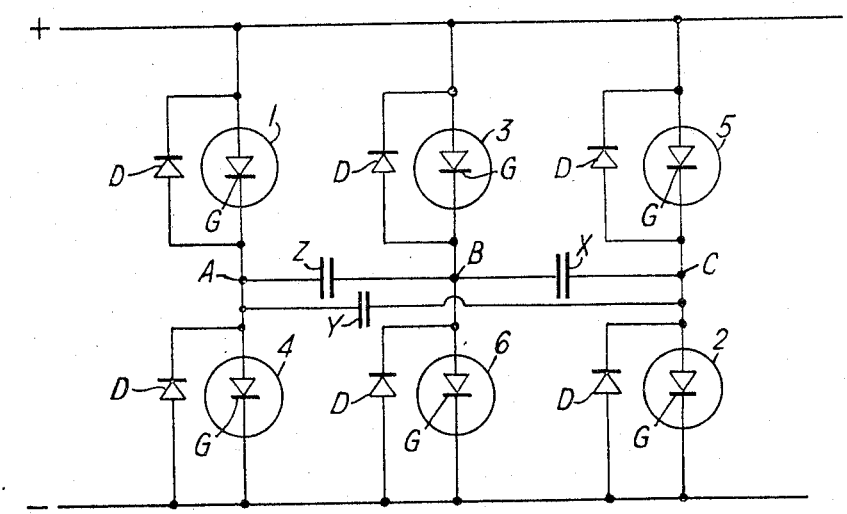

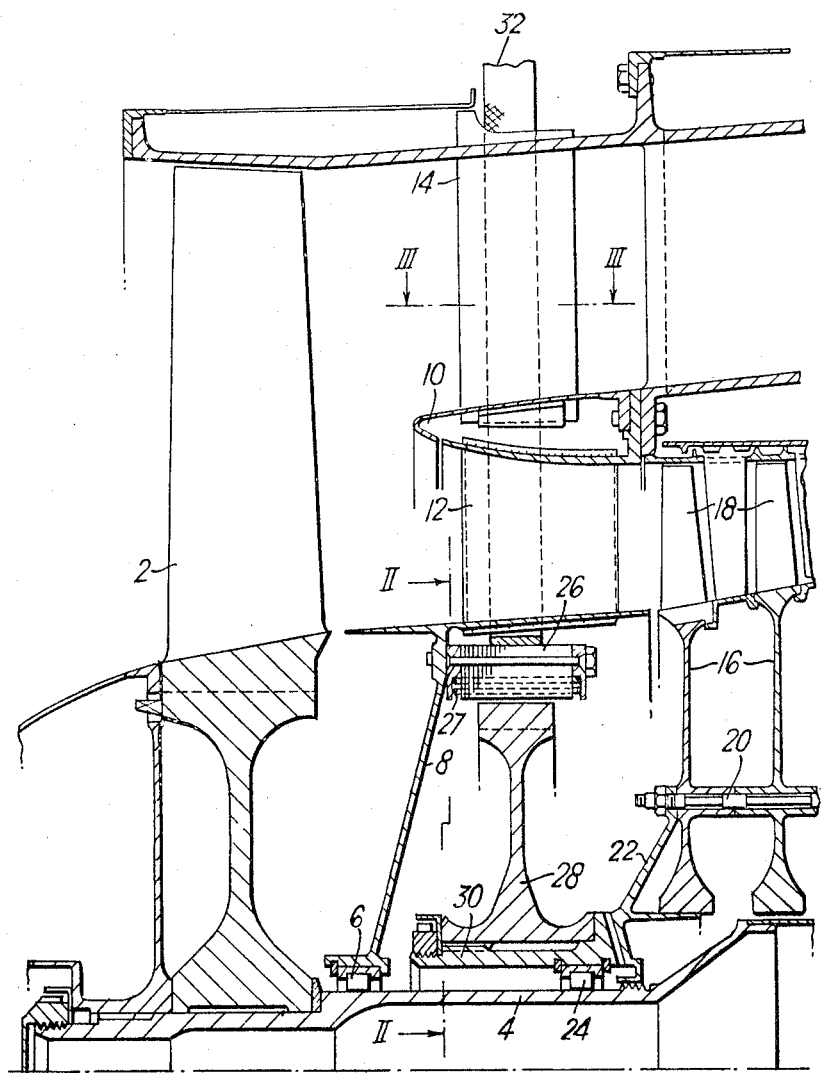

3,264,482
GAS TURBINE ENGINES
Kenneth William Clark and Donald Glenfield Seymour, Bristol, England, assignors to Bristol Siddeley Engines Limited, Bristol, England, a British company
Filed Aug. 22, 1963, Ser. No. 303,805
Claims priority, application Great Britain, Aug. 27, 1962, 32,821/62
6 Claims. (Cl. 290—38)

This invention concerns gas turbine engines arranged so as to be started by electric power, and so as to generate electric power when running, for use in an electric system of auxiliary equipment.

Such engines hitherto have included a radial shaft and sets of bevel gearing and reduction gearing, mechanically connecting a shaft of the gas turbine to the shafts of two D.C. machines mounted outside the gas turbine housing, the machines having associated switch gear enabling operation, at selection, of one machine as a starter motor or the other machine as a generator.

According to the present invention, an A.C. machine is provided within a gas turbine engine, the machine comprising a polyphase wound stator and multiple permanent magnet rotor poles carried concentrically by a rotor of the gas turbine engine, and switching and rectifying means are provided enabling the machine, at selection, either to feed D.C. power into an auxiliary electrical system, or to operate as a motor with the connections between a D.C. power supply and successive points around the stator winding being cyclically changed by brushless means responsive to rotation of the rotor poles.

Examples of brushless means responsive to rotation are Hall generators which sense the magnetic field of the rotor, or photo-electric cells which sense light reflected from bright spots on the rotor. Such means may have their output switching signals amplified before use.

An engine according to the present invention satisfies the usual requirement that the auxiliary electric system should include a battery, which necessarily stores power in D.C. form. At the same time the arrangement avoids the need for any mechanical transmission gearing, and thus saves considerable weight and avoids several problems of lubrication and cooling. It increases the size of the gas turbine engine, as compared with an engine having no starter or generator, solely by a very slight increase in length, of the order of one inch, and by the provision of a small housing for the switching and rectifying means.

Preferably, the rotor is connected to rotate with a compressor of the gas turbine engine. In a preferred arrangement for a gas turbine engine including a low pressure compressor and a high pressure compressor, the rotor is located between the low pressure compressor and the high pressure compressor, and is connected to rotate with the high pressure compressor.

Details of one particular arrangement will now be described with reference to the accompanying drawings, in which:

FIGURE 1 is a longitudinal half-section through the compressors of a bypass-type gas turbine engine;

FIGURE 2 is a fragmentary view from the line II—II in FIGURE 1;

FIGURE 3 is a fragmentary section on the line III—III in FIGURE 1;

FIGURE 4 is a diagram of a switching and rectifier circuit;

Figure 5:
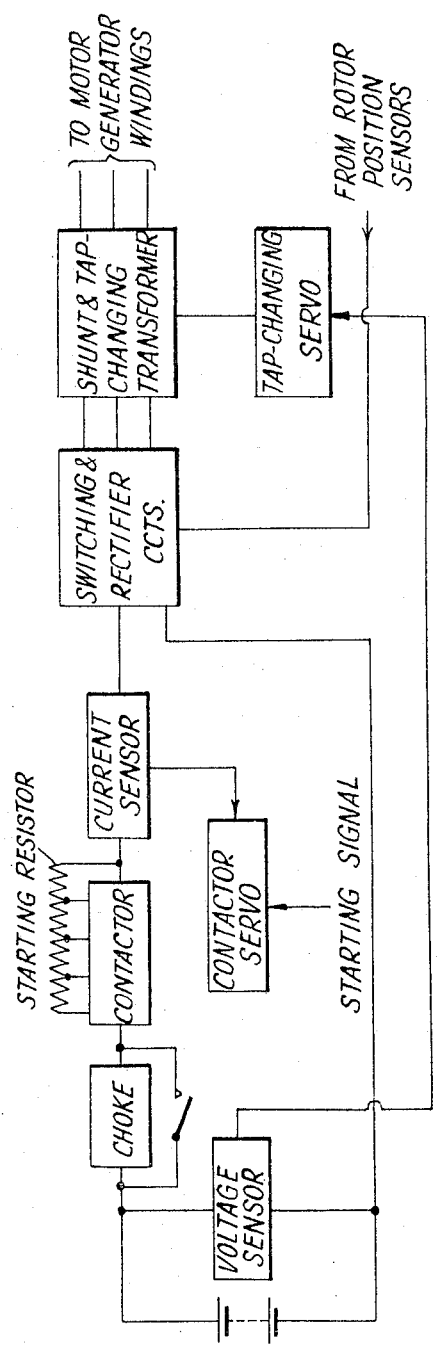
FIGURE 5 is a block diagram of part of the electrical system.

The engine has a single-stage L.P. compressor in the form of a fan 2 on a tubular shaft 4, which is journalled in a front bearing 6 in a fixed disc 8. This disc is supported from an annular dividing wall 10 by vanes 12, and the wall 10 is in turn supported by vanes 14. Outside the wall 10 is a bypass passage. Within the wall 10 is a multi-stage H.P. compressor of which only the first two stages are shown. The rotor of this compressor comprises a series of discs 16 carrying blades 18, and secured together by long axial bolts 20. At the front end, these bolts secure the H.P. compressor rotor to a bearing ring 22 which is journalled on the L.P. shaft by a bearing 24.

The A.C. starter-generator is located in the space between the fixed disc 8 and the bearing ring 22, and consists of an annular stator 26 fixed to the back of the disc 8, and a rotor disc 28 formed from magnetic steel and keyed to a forward extension 30 of the bearing ring 22. The rotor disc 28 has a number of magnets 29 arranged around its periphery, the outer ends of the magnets being alternately north and south poles, as shown in detail in FIGURE 2. The magnets 29 are weak in tension, and so are held in place by means of load-carrying retainers 31 having a dovetail cross-section, which retainers are made of non-magnetic steel. The stator is of laminations bolted together, with notches 25 in its internal periphery, accommodating a polyphase winding, in this example a three-phase winding 27. The connections to the winding 27 are made by ribbon-shaped insulated conductors 32 passing through certain of the vanes 12 and 14, as shown in FIGURE 3. These are much thinner than those needed to house a radial shaft.

The starter-generator is self-cooling by virtue of its position in the engine. It involves no additional bearings.

The stator winding is electrically of star form, with its three arms connected respectively to the points A, B, C in the circuit shown in FIGURE 4. In this circuit the silicon controlled rectifiers (SCR) 1 to 6 are switched on in the sequence of their numbers, two SCR's being "on" at any instant. The switching signals are fed into the gates G, and are derived from the rotor position sensors. In operation, starting say from the position in which SCR's 6 and 1 are conducting, the switching of SCR 2 to "on," i.e. to the conducting state, lowers point C to the negative rail voltage. Then a capacitor X between points B and C discharges through 2 and 6. This discharge and the inductive nature of the load cause the current through SCR 6 to reverse momentarily whereby SCR 6 reverts to the "off" state and then stays there. Similarly switching SCR 3 "on," switches SCR 1 "off" and so on. Inductive switching transients or pulses are limited by diodes D reverse-connected across the SCR's. These diodes D also serve to limit the voltage rise at points A, B, and C due to the discharge of the capacitors X, Y, Z, during switching, and they also serve as power rectifiers in the generating mode of operation. For control of generated power, the three of these diodes D connected to one rail may be replaced by SCR's.

The signals to the gates G of the SCR's are produced by rotor position sensors, not specifically illustrated, which are photo-electric cells adapted to sense light reflected from bright areas on the rotor to produce said signals in an order corresponding to the direction of rotation of the rotor so as to supply the three phases of the motor winding to maintain such rotation.

FIGURE 5 of the accompanying drawings is a block diagram of part of the system in which the switching and rectifier circuits shown in FIGURE 4 are incorporated.

Figure 6:
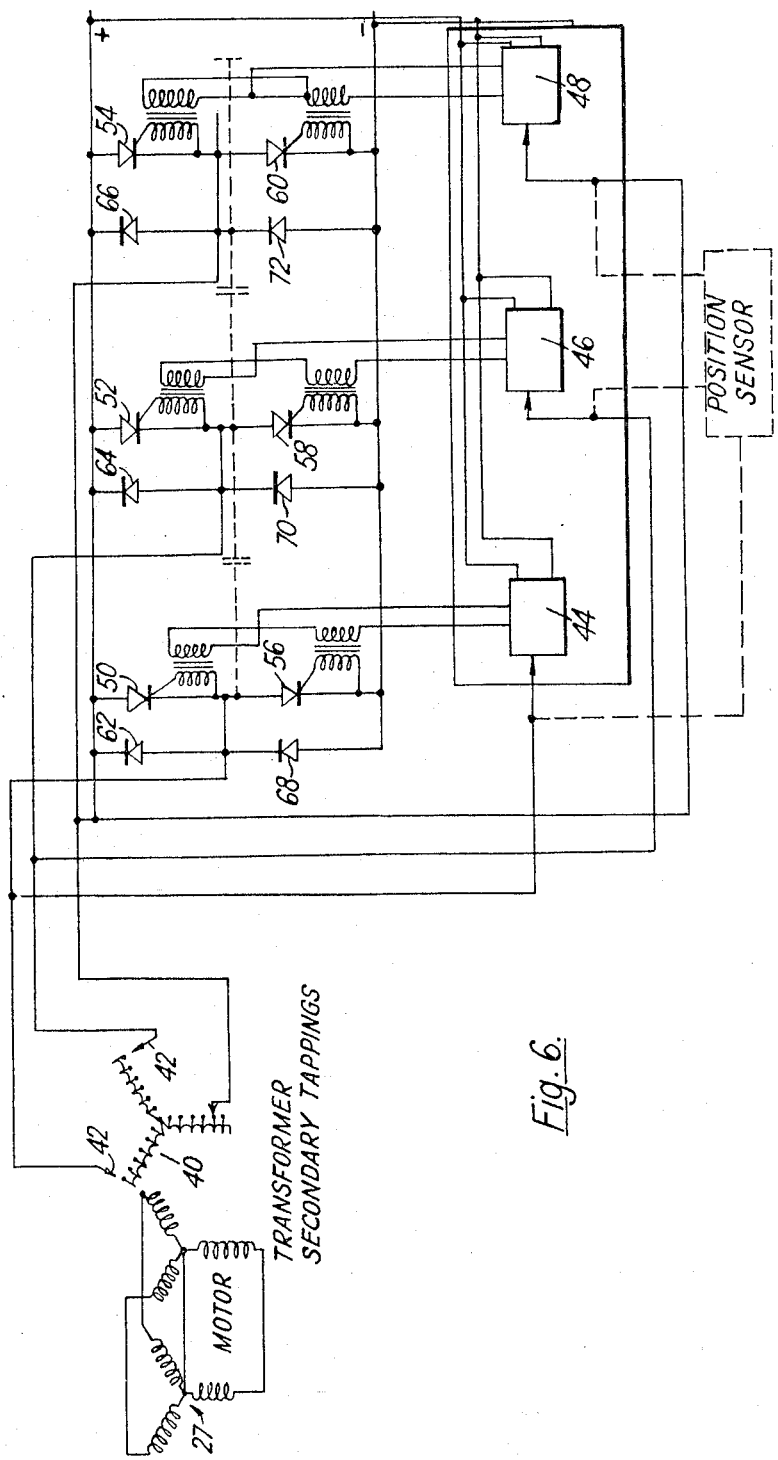
FIGURE 6 is a diagram of an alternative switching and rectifier current system.

FIGURE 6 shows an alternative switching current in which the need for the capacitors such as X, Y, Z in FIGURE 4 is avoided by performing the "switch on" operations sufficiently early, in a manner analogous to the use of brush lead in D.C. commutator motors, provided the motor-generator is rotating at a speed sufficient to develop adequate back E.M.F. The capacitors such as X, Y, Z, are not then required to transmit the current pulses between the SCR's.

In the circuit shown, a transformer 40 is connected between the motor-generator winding 27 and the switch circuit, and the transformer tappings 42 are changed so as to maintain an approximately constant mean current in the motor supply lines, and hence approximately constant generated back E.M.F. referred to the transformer primary, as long as resistive voltage drops are low compared with the generated back E.M.F. The tappings 42 may be operated by electromechanical servos or SCR's controlled by signals derived from sensors of the motor line current.

Control circuits 44, 46, and 48 comprise Schmidt trigger and differentiating circuits generating positive and negative pulses respectively when the input voltages pass through predetermined levels in the positive and negative going directions respectively, these input voltages being derived from the transformer 40 via the secondary tappings 42. The connections to the SCR's are so arranged that SCR's 50, 52, 54 are switched on by the positive pulses derived from their respective phase controls, and the negative pulses switch on the corresponding SCR's 56, 58, 60 to the negative supply line.

The predetermined voltage levels in the control circuits are so chosen that at the instant of switching each SCR on, the back E.M.F. of the corresponding phase is well below the supply voltage, whilst the phase connected to the same supply line as that just switched on has a back E.M.F. almost equal to or slightly greater than the supply. Then the two phases mentioned are effectively short-circuited and the current in that just switched on rises rapidly whilst that in the other phase falls. If the moment of switching is chosen correctly then the current in the last mentioned phase falls to zero while its back E.M.F. is still considerably above that of the phase just switched on and the corresponding SCR switches off automatically. The efficiency and speed of commutation may be improved by the inclusion of inductance in the D.C. supply lines.

For starting from rest, when no back E.M.F. is available to perform the commutating operations the machine may be supplied at reduced current either from a slowly accelerated mechanical commutator or from say a standard 400 c.p.s. supply. In the latter case the machine operates as an inefficient induction motor until such a speed is reached that the generated E.M.F. is sufficient to operate the automatic commutation circuits described above.

Alternatively it may be possible to use commutating capacitors between the three transformer primary supply lines in the initial stages when the supply current is very low, these capacitors then being only a small fraction of the size required for this purpose at full motor design power. In this case position sensors such as Hall effect devices are required to supply the input voltages for operation of the control circuits $C_1$, $C_2$, $C_3$, generating the switching pulses at the correct motor positions.

The diodes 62 to 72 shown in the circuit serve to shunt any undesirable switching transients, any may also serve as generating rectifiers when the engine is running normally. Additionally, if three of these diodes are replaced by SCR's these may be gated for voltage or current control, reducing or eliminating the need for additional transformer tappings for this purpose when generating over a wide speed range.

We claim:

1. Two-spool gas turbine engine for aircraft propulsion comprising a pair of axially aligned first and second axial flow compressors, an annular duct communicating at least a part of the output of the first compressor to the second compressor, said duct including inner and outer annular walls, guide vanes radially connected between said walls, an auxiliary A.C. machine, e.g. for starting the engine, situated at the inside of said inner wall and axially between said compressors, said machine including a stator supported by said inner wall and a rotor drivingly connected to one of the compressors to be rotated thereby, and electrical cable means connected to the stator from a position outside said outer wall and passing to the stator through the interior of at least one of said vanes.

2. Engine as claimed in claim 1 wherein said rotor is secured to said second compressor.

3. Engine as claimed in claim 2 comprising a shaft to which the first compressor is secured, a bearing supporting the first shaft for rotation, structure supporting said bearing on said inner wall, said rotor being situated between said structure and said second rotor.

4. Engine as claimed in claim 3 wherein said stator is secured to said structure at the side thereof facing the second compressor.

5. Engine as claimed in claim 3 comprising bearing means supporting said second compressor for rotation on said shaft in a position adjacent said rotor.

6. Engine as claimed in claim 1, said A.C. machine being a motor and said stator having windings requiring cyclic energization to drive the rotor, the assembly including a D.C. power supply and a brushless means responsive to the rotation of the rotor connected between said power supply and said windings to effect said cyclic energization of said windings.

References Cited by the Examiner

UNITED STATES PATENTS

| | | |
|---|---|---|
| 2,489,683 | 11/1949 | Stalker. |
| 2,609,659 | 9/1952 | Price. |
| 2,853,638 | 9/1958 | Bonnano et al. ____ 290—52 XR |
| 2,960,644 | 11/1960 | Momberg et al. __ 318—227 XR |
| 3,148,282 | 9/1964 | Hoffman _____ 290—52 |
| 3,169,203 | 2/1965 | Lavin et al. _____ 310—156 |
| 3,185,910 | 5/1965 | Knapp _____ 318—416 XR |
| 3,187,188 | 6/1965 | Adkins et al. _____ 290—52 XR |
| 3,189,810 | 6/1965 | MacGregor _____ 318—227 |

ORIS L. RADER, *Primary Examiner.*

G. SIMMONS, *Assistant Examiner.*